Nov. 2, 1937.  R. J. PARSONS  2,098,194
HEATING AND VENTILATING SYSTEM
Filed June 12, 1936
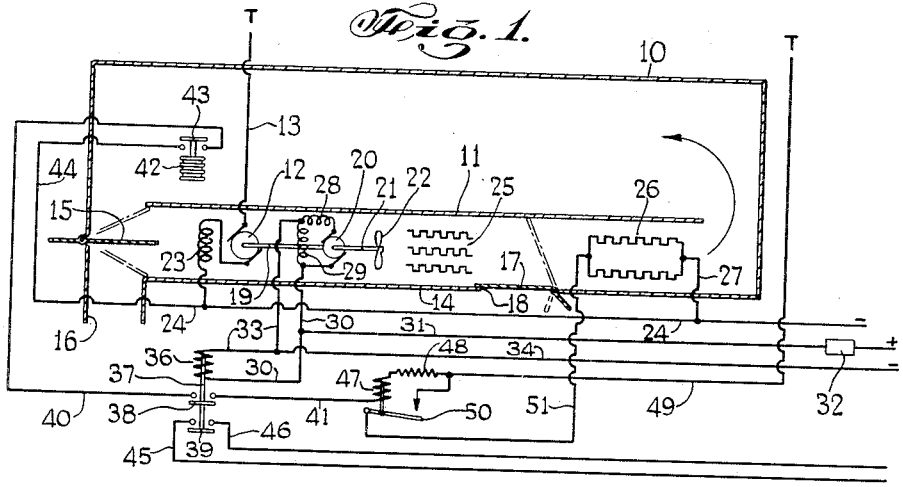
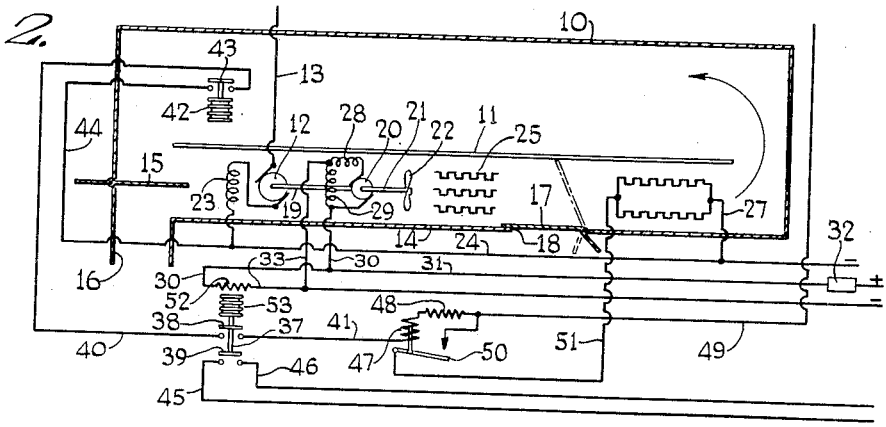
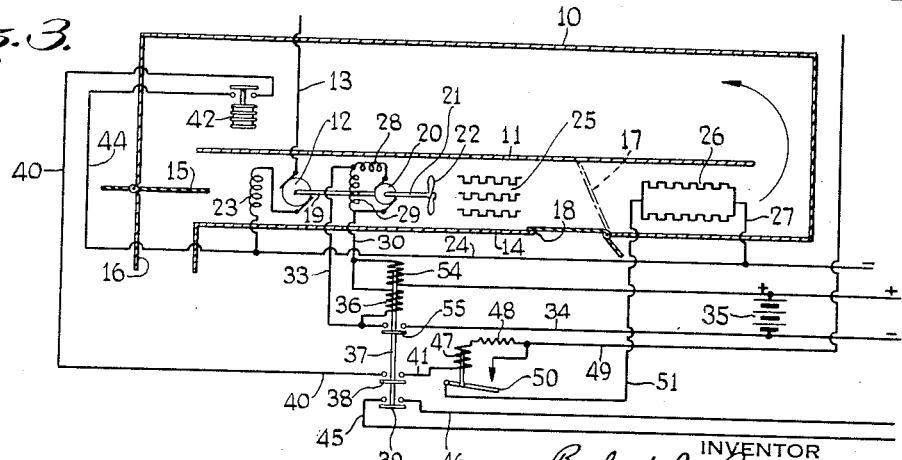
INVENTOR
Robert J. Parsons
BY
Lyman E. Dodge
ATTORNEY Patented Nov. 2, 1937

2,098,194

UNITED STATES PATENT OFFICE 2,098,194

HEATING AND VENTILATING SYSTEM

Robert J. Parsons, Schenectady, N. Y., assignor to Consolidated Car-Heating Company, Inc., Albany, N. Y., a corporation of New York Application June 12, 1936, Serial No. 84,878

10 Claims. (Cl. 219—20)

This invention relates to new and useful improvements in heating and ventilating apparatus and especially to those in which heating resistances and fan blowers are employed to create the desired heat and to distribute it.

An object of the invention is to provide means so that the heating resistances are not made effective until and unless the fan blower is in operation.

A further operation is to provide means whereby the main power cannot be made effective to other uses until and unless the fan blower is in operation.

Yet a further object is to provide means whereby at least one of the heating resistances cannot be made effective unless the heat in the enclosure to be heated is at a predetermined minimum level.

Still a further object is to provide means associated with the operation of the fan blower to charge a battery and prevent the feed back of the battery current when it is fully charged or the fan blower is idle.

Further and more specific objects, features, and advantages will more clearly appear from a consideration of the specification hereinafter when taken in connection with the accompanying drawing which forms part of the specification and which illustrates present preferred forms which the invention may assume.

A general consideration of the invention as to its broadest and most general aspects involves the use of a rotating fan blower in association with a series of heating resistances in order to heat and ventilate an enclosure which may in some instances be the interior of a trolley car. It is desired to have the arrangement such that if heat or propulsion is desired neither can be accomplished unless the fan is operating. The traction motor circuit is placed in operative condition as soon as the fan starts, but the flow of energy to supplemental heating resistances is governed by a thermostat positioned in the space to be heated. A generator on the fan shaft is also effective to charge a battery which may be a lighting battery and means such as reverse current relays and differential relays prevent the feed back of the battery current to the other circuits when the battery is fully charged and the fan is not rotating.

The preferred present forms which the invention may assume are shown in the drawing of which:

Figure 1 is a diagrammatic sketch of one form of the invention; Fig. 2 is a similar view of a modified form of the invention; and Fig. 3 is still another modification of the invention in schematic diagrammatic form.

In the drawing, 10 represents a space which is to be heated or ventilated and may be a room, a hall, a trolley car or other enclosure. Preferably disposed beneath the flooring of the enclosure 10, which flooring is represented by the numeral 11, is a motor 12, connected to a source of power by a wire 13. Preferably this motor and associated apparatus is disposed in a flue or duct formed by the flooring 11 and the lower wall 14. At its right hand end the flue or duct is open to the space or enclosure to be heated or ventilated. At its left end the flue or duct may be controlled by means of a damper plate 15. When in its upper position, the damper plate 15 closes the draft end of the duct to the enclosure to be heated or ventilated but opens it to admission of air from the outside of the car, or room by way of an admission port 16. In its lowermost position, the damper plate 15 will close the connection between the duct and the admission port 16 but will open the connection between the enclosure to be heated or ventilated and the duct at the left end of the duct. In its neutral position the damper plate 15 allows flow of air both between the enclosure to be heated and the admission port 16 to the left end of the duct.

Near its right end the duct is provided with another damper plate 17. In its upper position this damper plate 17 prevents air from passing from the duct to the right end of the enclosure but allows it to pass out downwardly through an exhaust port 18. In its lower position this damper plate 17 closes the exhaust port 18 and allows the air to pass through the duct and out at its right end to the enclosure.

The motor 12 is connected mechanically by a shaft 19 to a generator 20 which also has a shaft 21 supporting a blower element or fan 22. The field coil 23 of the motor is connected to a wire 24 leading to the negative side of the power line. To the right of the fan 22 in the duct are heater elements or resistances such as 25 and 26, the first being the ordinary resistance connected in circuit with the trolley motor or power line in any suitable manner, not shown, and the second one being a straight heater resistance positioned anywhere along the duct and which is connected on one side by wire 27 to the negative side of the power line.

The generator 20 has series and shunt or field coils 28 and 29 and one side of the field coil 29 is connected by wire 30 to a wire 31 leading to one side of a battery and in this wire 31 near the battery is located a reverse current relay 32 to prevent the battery from feeding current back through the generator. The other side of the field coil 29 is connected by wire 33 to a wire 34 leading to the other side of the battery which is indicated in Fig. 3 at 35, and in which figure because of connections to be later described, no reverse current relay such as 32 is necessary. The wires 30 and 33 are also connected to a relay coil 36 in Fig. 1. This coil lifts a stub shaft 37 carrying bridge contacts 38 and 39. The bridge contact 38 when closed connects wires 40 and 41. Wire 40 leads to a thermostatic device 42 disposed in the enclosure to be heated or ventilated, and has a bridging contact 43 which when closed connects wire 40 with a wire 44 which leads back to the negative side of the power line.

The bridge contact 39, when closed, connects wires 45 and 46 which lead to a power circuit which may be the circuit of the trolley motor when the enclosure to be heated or ventilated is the interior of a trolley car or other similar vehicle. The wire 41 connected by bridge 38 to the wire 40 is connected to a relay coil 47 in series with a resistance 48 and a wire 49 leading back to the other side of the power line. This relay coil operates a relay switch element 50 and when closed connects a wire 51 leading from the left side of resistance 26 to the wire 49 just referred to.

In Fig. 2, the wires 30 and 33 are connected to a heating resistance 52 instead of to a relay coil such as 36 and this heating resistance heats a thermostatic unit 53 which is connected to the stub shaft 37, otherwise the constructions in Figs. 1 and 2 are the same.

The construction of Fig. 3 is somewhat different in that the relay coil 36 is associated with another coil 54 which is differentially wound and is in series between the wires 30 and 31. The stub shaft 37 also has a third bridge contact element 55 which bridges when closed a gap between wires 33 and 34.

In the general operation of the device shown in Fig. 1, it will be seen that when the two wires marked T are connected to the source of power as by placing the trolley on the wire when the enclosure to be heated or ventilated is a trolley car, then the motor 12 is energized and starts to rotate thus rotating the shaft 19 and turning the generator 20 which will then supply current to the wires 31 and 34 forming the battery circuit thus charging the battery. The reverse current relay 32 will prevent a reversal of the current flow. As soon as the generator 20 starts up it will supply current to the relay coil 36 which will thus lift stub shaft 37 and close bridge contacts 38 and 39. Closing bridge contact 39 will close the traction motor control circuit through wires 45 and 46. Closing bridge contact 38 will close circuit to thermostat device 42 and relay coil 47. If the heat in the enclosure is low enough then the bridge contact 43 is closed and the circuit is then completed to energize the relay coil 47 and lift switch element 50 to close circuit from power line through the heating resistance 26. It is obvious however that the relay coil 36 is not energized unless the motor 12 is running and therefore unless the fan 22 is turning. Unless the relay 36 is energized the main motor circuit cannot be closed and the heater resistances 25 and 26 cannot be put into operation.

The operation of the specification shown in Fig. 2 is the same except that the running of the generator 20 energizes the heater coil 52 to activate the thermostat 53 and lift the stub shaft 37 in that manner to close the bridge contacts 38 and 39. Otherwise the same construction and functions are involved as with the arrangement of Fig. 1.

The operation of the modification shown in Fig. 3 is largely the same as for the other forms except as to the operation of the differential coils 36 and 54, and the bridge contact 55. When the generator starts up it feeds and energizes coil 36 which is strong enough to lift stub shaft 37 thus closing bridge contacts 38, 39, and 55. Closing 38 and 39 result as above mentioned but the closing of bridge contact 55 closes the circuit to one side of the battery 35 the other side of which is connected to the generator through differential coil 54. If reverse current tends to flow back from the battery it will act upon the differential coils in such a manner as to deenergize the relay and allow stub shaft 37 to drop and open all the bridge contacts.

It will therefore be seen that in these various forms of the invention the main power drive and the heating resistances cannot become effective until and unless the fan shaft is rotating because until this is rotating the generator thereon will not energize the relay connected thereto to close the circuits upon the closing of which the operation of the power drive and the heating resistances depend. Therefore in the operation of the trolley car form of the invention, the car cannot be started unless the blower fan is in operation.

When the damper plate 15 is in neutral position and the damper plate 17 is up then air can be drawn in from outside and out through exhaust opening 18 and at the same time drawn from the car or enclosure to exhaust the bad air therefrom by the suction of the fan action. The same exhaust action can be obtained by lowering the damper plate 15 and leaving the damper plate 17 up. If the damper plate 15 is put up and the damper plate 17 put down then the air is drawn in through admission port 16 past the heating resistances 25 and 26 and then blown into the enclosure by the blower fan 22.

Thus it will be seen that the enclosure of whatever nature it may be can be effectively ventilated and heated by the selective disposition of the damper plates and that the main power cannot be applied until the fan is running and the resistances for heating are not made effective until the fan is moving to take care of the generated heat. The battery employed and charged by the generator may be a lighting battery and is prevented in the manner shown from feeding back to the generator circuit. In all of these forms the heating operation is made effective only when the thermostat in the enclosure is in position which indicates the need for heat, but it is to be understood that manual control is not excluded.

While the invention has been described in detail and with respect to present preferred forms which the invention may assume, it is not to be limited to such forms and details since many changes and modifications may be made in the invention without departing from the spirit and scope of the invention in its broadest aspects. Hence it is desired to cover any and all forms and modifications of the invention which may come within the language or scope of any one or more of the appended claims.

What I claim as my invention and desire to secure by Letters Patent of the United States, is:

1. In combination with a vehicle, and an electrically energizable driving circuit therefor, of an enclosure to be heated and ventilated, a fan blower, heating resistances associated therewith, and means whereby the resistances are not placed in operation nor can the driving circuit be operated, until the fan is in operation.

2. In combination with a vehicle, and an electrically energizable driving circuit therefor, of an enclosure to be heated and ventilated, a fan blower, heating resistances associated therewith, a thermostat in the enclosure, means whereby the resistances are not placed in operation, nor can the driving circuit be operated, until the fan is in operation, and means whereby at least one of the resistances is not placed in operation until the thermostat closes a circuit to it.

3. In combination, an enclosure to be heated and ventilated, a fan blower, heating resistances associated therewith, a generator driven by the fan blower, a relay switching element in circuit with the generator, and means operated by the relay when energized by the generator to close circuits to said resistances and to a main power drive device.

4. In combination, an enclosure to be heated and ventilated, a fan blower, heating resistances associated therewith, a generator driven by the fan blower, a relay switching element in circuit with the generator, a thermostat in the enclosure, means operated by the relay when energized by the generator to close circuits to said resistances and to a main power drive device, said thermostat being in circuit with one of said resistances and closed only when the heat in the enclosure is at a minimum.

5. In combination, an enclosure to be heated and ventilated, a fan blower, heating resistances associated therewith, a generator driven by the fan blower, a relay switching element in circuit with the generator, a thermostat in the enclosure, means operated by the relay when energized by the generator to close circuits to said resistances and to a main power drive device, said thermostat being in circuit with one of said resistances and closed only when the heat in the enclosure is at a minimum, and a second relay in circuit with the thermostat and energized when the thermostat is closed to close the circuit to the one of said resistances.

6. In combination, an enclosure to be heated and ventilated, a fan blower, heating resistances associated therewith, a generator driven by the fan blower, a switching element in circuit with the generator and energized thereby and means operated by the switching element when energized by the generator to close circuits to said resistances and to a main power drive device.

7. In combination, an enclosure to be heated and ventilated, a fan blower, heating resistances associated therewith, a generator driven by the fan blower, a switching element, thermostatically operated, a heating coil adjacent said switching element and in circuit with said generator, and means operated by the switching element when energized by the generator to close circuits to said resistances and to a main power drive device.

8. In combination, an enclosure to be heated and ventilated, a fan blower, heating resistances associated therewith, a generator driven by the fan blower, a switching element, thermostatically operated, a heating coil adjacent said switching element and in circuit with said generator, a second thermostat in the enclosure, means operated by the switching element when energized by the generator to close circuits to said resistances and to a main power drive device, said thermostat in the enclosure being in circuit with one of said resistances and closed only when the heat in the enclosure is at a minimum.

9. In combination, an enclosure to be heated and ventilated, a fan blower, heating resistances associated therewith, a generator driven by the fan blower, a thermostatically operated switching element, a heating coil adjacent said switching element and in circuit with said generator, a second thermostat in the enclosure, means operated by the thermostatically operated switching element when energized by the generator to close circuits to said resistances and to a main power drive device, said thermostat in the enclosure being in circuit with one of said resistances and closed only when the heat in the enclosure is at a minimum, a relay in circuit with the thermostat in the enclosure and energized when the enclosure thermostat is closed to close the circuit to the one of said resistances.

10. In combination, an enclosure to be heated and ventilated, a fan blower, heating resistances associated therewith, a generator driven by the fan blower, a switching element adapted to be energized by the generator, and having differential coils, a battery charged by said generator through at least one of said coils, the differential action of the coils tending to deenergize the switching element when the current feeds back from the battery, said differential relay when energized by the generator adapted to close circuits to said resistances and to a main power drive device.

ROBERT J. PARSONS.